(12) United States Patent
Farrington et al.

(10) Patent No.: US 10,826,083 B2
(45) Date of Patent: Nov. 3, 2020

(54) FUEL CELL ASSEMBLIES WITH IMPROVED REACTANT FLOW

(71) Applicants: Daimler AG, Stuttgart (DE); Ford Motor Company, Dearborn, MI (US); Nissan Motor Co., LTD., Yokohama (JP)

(72) Inventors: Simon Farrington, Vancouver (CA); Christian Caussel, Burnaby (CA)

(73) Assignees: Daimler AG, Stuttgart (DE); Ford Motor Company, Dearborn, MI (US); Nissank Motor Co., Ltd., Yokohama (JP)

( * ) Notice: Subject to any disclaimer, the term of this patent is extended or adjusted under 35 U.S.C. 154(b) by 257 days.

(21) Appl. No.: 15/324,794

(22) PCT Filed: Jun. 24, 2015

(86) PCT No.: PCT/IB2015/001060
§ 371 (c)(1),
(2) Date: Jan. 9, 2017

(87) PCT Pub. No.: WO2016/005801
PCT Pub. Date: Jan. 14, 2016

(65) Prior Publication Data
US 2017/0200957 A1 Jul. 13, 2017

Related U.S. Application Data

(60) Provisional application No. 62/023,168, filed on Jul. 10, 2014.

(51) Int. Cl.
*H01M 8/026* (2016.01)
*H01M 8/0267* (2016.01)
(Continued)

(52) U.S. Cl.
CPC ......... *H01M 8/026* (2013.01); *H01M 8/0206* (2013.01); *H01M 8/0267* (2013.01);
(Continued)

(58) Field of Classification Search
CPC .. H01M 8/026; H01M 8/2483; H01M 8/0267; H01M 8/242; H01M 8/0273; H01M 8/241; H01M 8/0206
See application file for complete search history.

(56) References Cited

U.S. PATENT DOCUMENTS

2007/0082252 A1  4/2007  Goebel et al.
2008/0113254 A1  5/2008  Christie et al.
(Continued)

FOREIGN PATENT DOCUMENTS

DE  102011009805 A1  8/2011
JP  200377499 A  3/2003
(Continued)

OTHER PUBLICATIONS

International Search Report and Written Opinion in International Application No. PCT/IB2015/001060, dated Sep. 23, 2015.
(Continued)

*Primary Examiner* — Eugenia Wang
(74) *Attorney, Agent, or Firm* — Patent Central LLC; Stephan A. Pendorf

(57) ABSTRACT

In solid polymer electrolyte fuel cell stacks, increasing the height of support features in the transition regions and/or increasing the depth of the transition regions improves the flow of reactants therein and thus improves the sharing of flow in the channels in the reactant flow fields. The support feature height and transition region depth are increased so as to be out of plane with respect to the landings and channels in the reactant flow fields. The invention is suitable for cells (Continued)

employing metal flow field plates or plates in which no adhesives are employed in the transition regions.

11 Claims, 2 Drawing Sheets

(51) Int. Cl.
  *H01M 8/2483* (2016.01)
  *H01M 8/241* (2016.01)
  *H01M 8/0206* (2016.01)
  *H01M 8/1007* (2016.01)
  *H01M 8/242* (2016.01)
  *H01M 8/0273* (2016.01)
  *H01M 8/1018* (2016.01)
(52) U.S. Cl.
  CPC ....... *H01M 8/0273* (2013.01); *H01M 8/1007* (2016.02); *H01M 8/241* (2013.01); *H01M 8/242* (2013.01); *H01M 8/2483* (2016.02); *H01M 2008/1095* (2013.01)

(56) References Cited

U.S. PATENT DOCUMENTS

| | | |
|---|---|---|
| 2008/0311461 A1 | 12/2008 | Farrington et al. |
| 2009/0169964 A1 | 7/2009 | Ikeda |
| 2011/0195332 A1 | 8/2011 | Goebel |
| 2012/0094208 A1* | 4/2012 | Sugiura ............... H01M 8/0206 429/482 |
| 2012/0321987 A1* | 12/2012 | Goto ................... H01M 8/0258 429/480 |
| 2013/0089802 A1 | 4/2013 | Artibise et al. |

FOREIGN PATENT DOCUMENTS

| | | |
|---|---|---|
| JP | 2014186823 A | 10/2014 |
| WO | 2008030504 A1 | 3/2008 |
| WO | 2013171323 A1 | 11/2013 |

OTHER PUBLICATIONS

Japanese Office Action (with English language translation) dated Dec. 26, 2017, in Japanese Application No. 2016-575731.
Japanese Office Action (with English language translation) dated Aug. 14, 2018, in Japanese Application No. 2016-575731.

* cited by examiner

FUEL CELL ASSEMBLIES WITH IMPROVED REACTANT FLOW

BACKGROUND

Field of the Invention

This invention relates to the flow of reactants in fuel cell assemblies for solid polymer electrolyte fuel cell stacks. In particular, it relates to designs and methods for improving the flow of reactants in the transition regions of the flow field plates for such fuel cells.

Description of the Related Art

Fuel cells electrochemically convert fuel and oxidant reactants, (e.g. hydrogen and oxygen or air respectively), to generate electric power. One type of fuel cell is a solid polymer electrolyte fuel cell which generally employs a proton conducting polymer membrane electrolyte between cathode and anode electrodes. The electrodes contain appropriate catalysts and typically also comprise conductive particles, binder, and material to modify wettability. A structure comprising a proton conducting polymer membrane sandwiched between two electrodes is known as a membrane electrode assembly (MEA). Such assemblies can be prepared in an efficient manner by appropriately coating catalyst mixtures onto the polymer membrane, and thus is commonly known as a catalyst coated membranes (CCM).

Anode and cathode gas diffusion layers are usually employed adjacent their respective electrodes on either side of a catalyst coated membrane. The gas diffusion layers serve to uniformly distribute reactants to and remove by-products from the catalyst electrodes. Fuel and oxidant flow field plates are then typically provided adjacent their respective gas diffusion layers and the combination of all these components represents a typical individual fuel cell assembly. The flow field plates comprise flow fields that usually contain numerous fluid distribution channels. The flow field plates serve multiple functions including: distribution of reactants to the gas diffusion layers, removal of by-products therefrom, structural support and containment, and current collection. Often, the fuel and oxidant flow field plates are assembled into a unitary bipolar plate in order to incorporate a coolant flow field therebetween and/or for other assembly purposes. Because the output voltage of a single cell is of order of 1V, a plurality of such fuel cell assemblies is usually stacked together in series for commercial applications. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields are typically formed on the electrochemically inactive surfaces of both the anode side and cathode side flow field plates and, by appropriate design, a sealed coolant flow field is created when both anode and cathode side plates are mated together into a bipolar plate assembly.

Numerous seals are required in typical fuel cell stack construction, and achieving adequate, reliable seals in a manner suitable for commercial, high volume manufacture is challenging. Around the periphery of the MEAs, pressurized fuel and oxidant gases must be separated from each other (i.e. gas shorting around the edges of the membrane must be prevented) and also prevented from leaking to the external environment. Frames are commonly used to seal working fluids at the edges of MEAs.

Conventional frames for MEAs typically comprise two polymeric films that are bonded to and sandwich the membrane or catalyst coated membrane at the edge. The frame is then used as a gasket for sealing purposes. Often the gas diffusion layers employed with such designs extend beyond the active area of the electrodes in order to mechanically assist in other peripheral seals. In these designs, elastomeric seals for external sealing of the fuel cell assembly may either be molded onto the bipolar plate or molded discretely and then preassembled to the bipolar plate. The polymeric films employed can be thermoplastics (e.g. polyethylene) or polymers coated with suitable adhesive (e.g. heat activated adhesive).

To provide both reactants and the coolant to and from the individual cells in the stack, a series of ports are generally provided at opposing ends of the individual cells such that when the cells are stacked together they form manifolds for these fluids. Further required design features then are passageways in the plates to distribute the bulk fluids in these formed manifolds to and from the various channels in the reactant and coolant flow fields in the plates. Herein, these passageway regions are referred to as the transition regions. The transition regions can themselves comprise numerous fluid distribution channels, e.g. oxidant and/or fuel transition channels. US20130089802 discloses certain exemplary port and transition region constructions in the prior art.

Another desirable feature in the flow field plates can include the use of what are known in the art as backfeed ports. Such ports allow for bulk fluids to initially be distributed from the formed manifolds to the "back" or inactive sides of the flow field plates and then subsequently to be fed to the active side of the plates through the backfeed ports. A reactant backfeed port is thus fluidly connected to a manifold port for that reactant via some suitable passage formed in the coolant surface of the plate. And the reactant backfeed port is also fluidly connected to the reactant flow field on the reactant surface of the plate via the passageways of the associated transition region. US20080113254 for instance discloses exemplary flow field plate constructions incorporating backfeed features.

It is generally preferable to supply and remove the reactant and coolant streams as uniformly or evenly as possible to and from their respective flow fields. This is to achieve uniform use of the active areas in the electrodes and provide even cooling of the plates, and thus avoid hot spots, non-uniform water distribution and management issues, and so on. However, it is challenging to distribute large volumes of fluid from single inlet manifolds uniformly to the numerous flow field channels and uniformly from the numerous flow field channels back to single outlet manifolds. This gets even more challenging as fuel cell and stack dimensions decrease as designers strive to improve power density from fuel cell stacks. As these dimensions shrink, the hydraulic size available for the transition regions also shrinks. Thus it gets increasingly difficult to distribute fluids to and from the numerous channels without experiencing significant pressure differences over the channel inlets and outlets, and hence it is increasingly difficult to achieve a desired uniformity in the distributions of the various fluids.

Consequently there is a continuing need for new designs and methods to improve the reactant flows and make them more uniform, particularly in the transition areas in such fuel cells. This invention fulfills these needs and provides further related advantages.

SUMMARY

The present invention provides for improved flow distribution of reactants in the transition regions of flow field plates for solid polymer electrolyte fuel cells and series stacks of such cells. The flow of reactant is shared more evenly amongst the plurality of channels in the flow fields in the active areas of the fuel cells. This is accomplished by increasing the height of support features in the transition regions and also optionally increasing the depth of the transition regions such that the support feature height and transition region depth are increased to be out of plane with respect to the landings in the reactant flow fields. The invention is particularly suitable for fuel cells employing metal flow field plates or plates in which no adhesives are employed in the transition regions.

Relevant fuel cell assemblies for such fuel cell stacks comprise a membrane electrode assembly, a frame, cathode and anode gas diffusion layers, oxidant and fuel flow field plates, and an edge seal for the assembly. Further, the membrane electrode assembly comprises a solid polymer electrolyte membrane electrolyte, a cathode on one side of the membrane electrolyte, and an anode on the other side of the membrane electrolyte. The frame is attached to the periphery of the membrane electrode assembly and can be made of plastic, e.g. polyethylene naphthalate. The cathode gas diffusion layer is adjacent to the cathode, and in a like manner, the anode gas diffusion layer adjacent to the anode. The oxidant flow field plate is adjacent to the cathode gas diffusion layer and comprises an oxidant flow field comprising a plurality of channels separated by landings on the side adjacent to the cathode gas diffusion layer, an oxidant port (and typically other ports as well), and a transition region between the oxidant flow field and the oxidant port in which the transition region has a depth and comprises support features. In these relevant fuel cell assemblies, essentially all of the cathode gas diffusion layer is adjacent the oxidant flow field (i.e. the cathode gas diffusion layer is absent from the transition region). Again in a like manner, the fuel flow field plate is adjacent to the anode gas diffusion layer and comprises a fuel flow field comprising a plurality of channels separated by landings on the side adjacent to the anode gas diffusion layer, a fuel port (and typically other ports as well), and a transition region between the fuel flow field and the fuel port in which the transition region has a depth and comprises support features. And again, in these relevant fuel cell assemblies, essentially all of the anode gas diffusion layer is adjacent the fuel flow field (i.e. the anode gas diffusion layer is absent from the transition region). The seal is for sealing the frame to the oxidant and fuel flow field plates at an edge seal location and can be made of an elastomer, e.g. silicone. In the present invention, the support features in the transition region of at least one of the oxidant and fuel flow field plates are taller than the landings in the flow field of the at least one flow field plate. In addition, the depth of the transition region of the at least one flow field plate can also be greater than the depth of the channels in the flow field of the at least one flow field plate.

The invention is particularly suitable for embodiments in which the at least one flow field plate is made of metal and/or for embodiments in which the transition region of the at least one flow field plate comprises no adhesive. Preferably, improvements are made to the flow in both the oxidant and the fuel flow field plates in the fuel cell assembly. Preferably therefore the support features in the transition regions of each of the oxidant and fuel flow field plates are taller than the landings in the respective flow fields of each of the oxidant and fuel flow field plates.

Compared to convention fuel cells then, the method of the invention comprises increasing the height of the support features in the transition region of at least one of, and preferably both, the oxidant and fuel flow field plates such that the increased support features are taller than the landings in the flow field of the at least one flow field plate. In addition, the method can comprise increasing the depth of the transition region of the at least one flow field plate, and preferably both plates, such that the depth of the deeper transition region is greater than the depth of the channels in the flow field of the at least one flow field plate. In certain practical embodiments, the height of the support features and the depth of the transition region are increased such that the total distance between the taller support features and deeper transition region is increased by an amount in the range from about 25 to 70%. Also, in certain practical the height of the support features and the depth of the transition region is increased such that the total distance between the taller support features and deeper transition region is increased by an amount in the range from about 100 to 400 micrometers.

These and other aspects of the invention are evident upon reference to the attached Figures and following detailed description.

DETAILED DESCRIPTION

Herein, the following definitions have been used. In a quantitative context, the term "about" should be construed as being in the range up to plus 10% and down to minus 10%.

The term "transition region" is used herein with reference to a region in between the channels in the reactant flow fields and the reactant ports in a fuel cell flow field plate. In this region, fluid flow transitions from a single, large body of flow into a multiplicity of small channel flow streams. A transition region generally comprises features in order to appropriately transition the flow of reactants and by-products between the distributed flow required in the flow fields and the bulk flow occurring at the ports. The transition region is generally not considered as an electrochemically active part of the fuel cell.

Phrases such as "wherein essentially all of the cathode gas diffusion layer is adjacent the oxidant flow field" are used herein in context with the gas diffusion layers and refer to the alignment of these layers with respect to the flow fields and consequently also with respect to the transition regions. In particular, the gas diffusion layers are intended to completely oppose their respective flow fields and thus they do not deliberately extend into the transition region spaces. However, due to tolerances in manufacture and assembly, there will not always be perfect alignment in practice. Thus, such phrases are intended to include some misalignment of these components as long as the functions and benefits of the invention are obtained.

Figure 1:
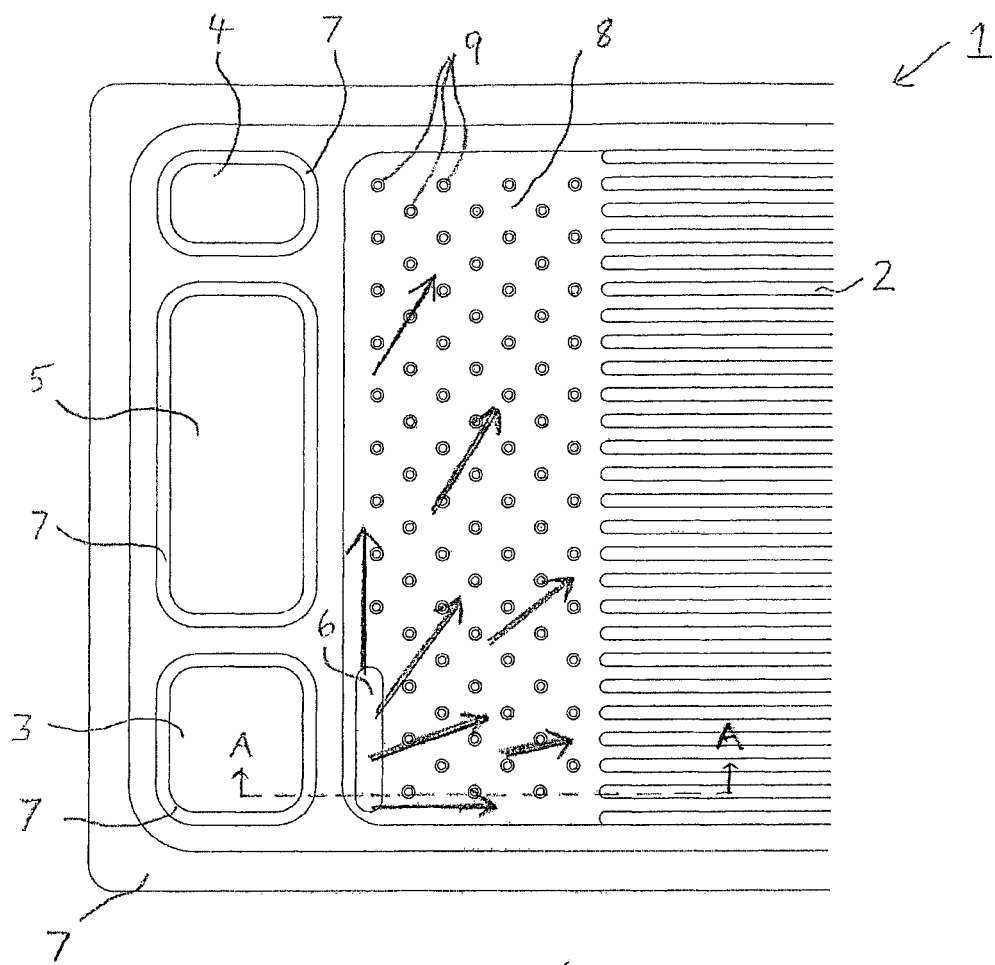
FIG. 1 shows a top view of the oxidant flow field side of an exemplary oxidant flow field plate for a solid polymer electrolyte fuel cell in the vicinity of the oxidant inlet end.

A top view of an exemplary oxidant flow field plate for a solid polymer electrolyte fuel cell is shown in FIG. 1 to illustrate the typical flow in a transition region. Specifically, FIG. 1 shows a top view of the oxidant flow field side of this plate in the vicinity of the oxidant inlet end. On the visible side of oxidant flow field plate 1 is oxidant flow field 2 comprising a plurality of oxidant channels separated by landings (these features are quite small in FIG. 1 and have not been identified with reference numerals). On the opposite side of oxidant flow field plate 1 is a coolant flow field (not visible in FIG. 1).

Oxidant flow field plate 1 comprises oxidant inlet port 3, fuel inlet port 4, coolant inlet port 5, and backfeed port 6. Seals 7 surround the various ports and the periphery of the plate at an edge seal location and serves several sealing functions including sealing the frame of a framed MEA (not present in FIG. 1) to plate 1. Transition region 8 occupies the space between backfeed port 6 and oxidant flow field 2. In the embodiment pictured in FIG. 1, transition region 8 comprises numerous cone shaped support features 9 which serve to support the frame of a framed MEA.

When assembled into a fuel cell stack, the numerous oxidant ports 3 in the stacked fuel cells form an oxidant inlet manifold. Oxidant is supplied to this inlet manifold and is thus distributed to each oxidant port 3 in the fuel cell stack. Oxidant flows from oxidant port 3 to backfeed port 6 and into transition region 8 where it spreads out to be distributed to the channel inlets in oxidant flow field 2. The flow of oxidant is qualitatively indicated by arrows in FIG. 1. As is evident from the design shown here, the incoming oxidant has further to travel through transition region 8 in order to access the uppermost channels in oxidant flow field 2 than it has to travel to access the lowermost channels in oxidant flow field 2. This results in an uneven flow of oxidant to the various channels. However the extent to which the flow is uneven depends on the resistance offered by the transition region to the flow of oxidant through it. The larger the hydraulic diameter is for the transition region, the lesser the resistance is to flow.

Figure 2:
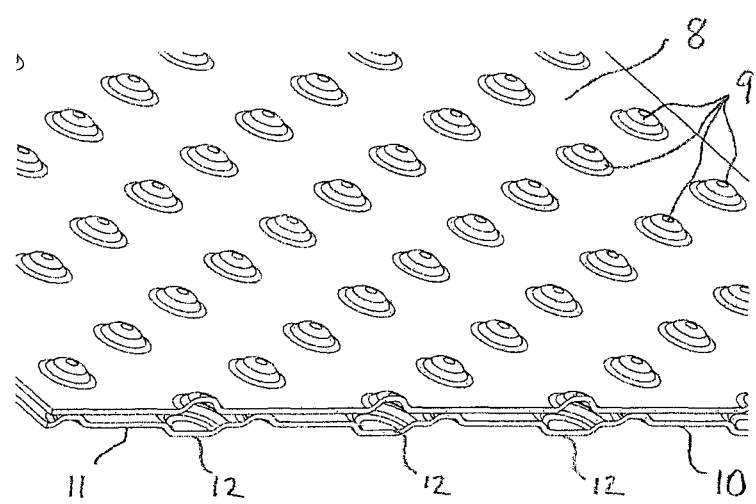
FIG. 2 shows a cross-sectional view of a bipolar plate which comprises the oxidant flow field plate of FIG. 1. The view is an enlarged isometric view in the transition region of the oxidant flow field plate.

FIG. 2 shows a cross-sectional view of a bipolar plate comprising the oxidant flow field plate 1 of FIG. 1. The view is an enlarged isometric view in the transition region of oxidant flow field plate 1. In FIG. 2, fuel flow field plate 10 appears underneath and is welded to oxidant flow field plate 1. The visible portion of fuel flow field plate 10 is also a transition region, namely transition region 11 for the fuel. In FIG. 2, transition region 11 comprises a plurality of support features 12 that are shaped differently from cone-shaped support features 9 in transition region 8. (In other embodiments, support features 9 and 12 may be shaped similarly.) In conventional fuel cells, cone-shaped support features 9 are at the same height in plate 1 as the landings in flow field 2 (i.e. the tops of support features 9 are in the same plane as the flow field landings). Also in conventional fuel cells, the depth of transition region 8 can be at the same height as the channels in flow field 2 (i.e. the base of transition region 8 is in the same plane as the bottoms of the flow field channels).

Figure 3:
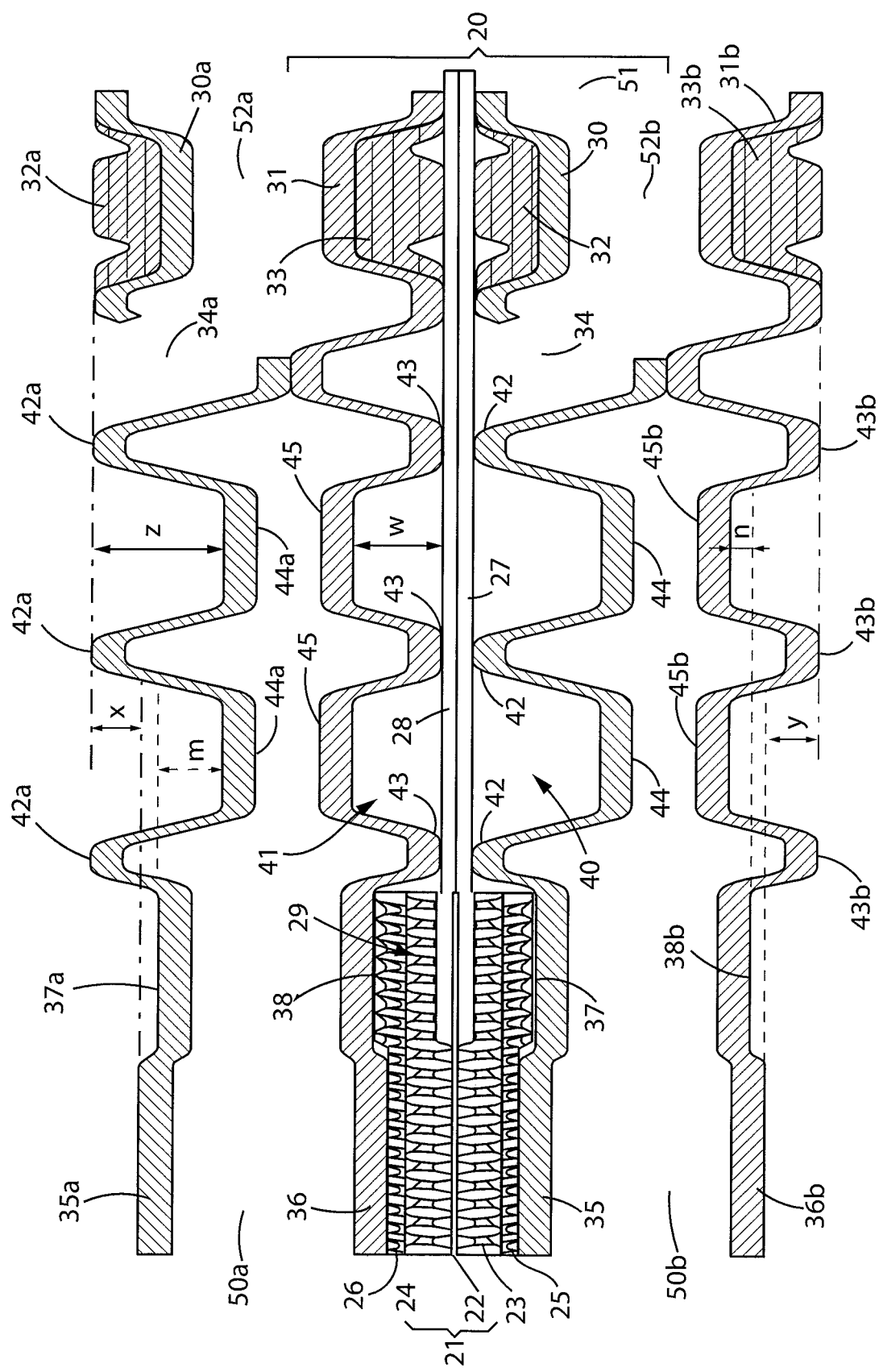
FIG. 3 shows a schematic cross-sectional view of the end of a fuel cell assembly comprising an oxidant flow field plate similar to that shown in FIG. 1 as it would appear in a fuel cell stack. The view is near the oxidant inlet port.

In the present invention, the effective hydraulic diameter of transition 8 is increased by increasing the height of support features 9 to be above the plane of the landings in flow field 2. In addition, the depth of transition region 8 can optionally be increased as well (i.e. the base of transition region 8 is lowered to be below the plane of the channels in flow field 2). By so doing, the oxidant is better distributed throughout transition region 8 and the sharing of flow amongst the channels in flow field 2 is improved. FIG. 3 illustrates how this can be accomplished in a practical embodiment for use in fuel cell stacks.

FIG. 3 shows a schematic cross-sectional view of the end of a fuel cell assembly comprising an oxidant flow field plate similar to that shown in FIG. 1 as it would appear in an assembled fuel cell stack. The view is near the oxidant inlet port and the section has been taken along the section A-A indicated in FIG. 1. Note also that portions of adjacent fuel cell assemblies also appear in FIG. 3.

Fuel cell assembly 20 includes MEA 21 which consists of solid polymer membrane electrolyte 22 which has been coated on opposing sides with cathode and anode catalysts to create anode 23 and cathode 24 respectively. Cathode gas diffusion layer 25 and anode gas diffusion layer 26 are located adjacent cathode 23 and anode 24 respectively. As shown in FIG. 3, cathode gas diffusion layer 25 terminates at the same point as cathode 23 and thus is essentially coextensive with cathode 23. Importantly, cathode gas diffusion layer 25 does not extend into oxidant transition region 40. In a like manner, anode gas diffusion layer 26 terminates at the same point as anode 24 and thus is essentially coextensive with anode 24. Again importantly, anode diffusion layer 26 does not extend into fuel transition region 41.

MEA 21 is framed with a two piece frame which extends from within MEA 21, through transition regions 40, 41, and beyond the sealing region which includes seal 32 for oxidant flow field plate 30 and seal 33 for anode flow field plate 31. Frame piece 27 and frame piece 28 sandwich membrane electrolyte 21 near the edge 29 of MEA 21 and are generally bonded thereto. Outside MEA 21, frame pieces 27 and 28 are bonded together directly.

Fuel cell assembly 20 also includes oxidant flow field plate 30 and fuel flow field plate 31 which are located adjacent cathode gas diffusion layer 25 and anode gas diffusion layer 26 respectively. The cross-sectional view of FIG. 3 cuts through oxidant backfeed port 34, oxidant port 51, and oxidant vias 52a and 52b (which appear on either side of fuel cell assembly 20 and fluidly connect oxidant port 51 to backfeed port 34 and to backfeed port 34a in the adjacent fuel cell assembly above). Note that in order to focus on the relevant structures of the inventive fuel cell assembly, FIG. 3 shows only a partial section of the end of the fuel cell stack. The structure on the outside of oxidant port 51 (which would appear further to the right if present in FIG. 3) has been omitted.

To assist in illustrating the invention, the plates and seals adjacent fuel cell assembly 20 are also shown in FIG. 3. These plates and seals are of similar construction to those in fuel cell assembly 20 and belong to adjacent fuel cell assemblies in the fuel cell stack. Thus, oxidant flow field plate 30a is similar to oxidant flow field plate 30, fuel flow field plate 31b is similar to fuel flow field plate 31, seal 32a is similar to seal 32, and seal 33b is similar to seal 33. Mated together, oxidant flow field plate 30a and fuel flow field plate 31 create coolant flow field 50a therebetween. In a like manner, the mated pair consisting of oxidant flow field plate 30 and fuel flow field plate 31b creates coolant flow field 50b therebetween.

Oxidant flow field plate 30 has an oxidant flow field &limed therein which is made up of numerous parallel, linear oxidant channels separated by oxidant landings 35. The base of the oxidant channels between landings 35 are not visible in FIG. 3. However, the height of oxidant flow field plate 30 near the entrance 37 of the oxidant channels is at the same height as the base of the oxidant channels themselves. In a like manner, fuel flow field plate 31 has a fuel flow field formed therein which is made up of numerous parallel, linear fuel channels separated by fuel landings 36. Again, the base of the fuel channels between landings 36 are not visible in FIG. 3. But again, the height of fuel flow field plate 31 near the entrance 38 of the fuel channels is at the same height as the base of the fuel channels themselves. Also shown in the adjacent fuel cell assemblies in FIG. 3 are oxidant landings 35a and entrance 37a to the oxidant channels formed in adjacent oxidant flow field plate 30a, along with fuel landings 36b and entrance 38b to the fuel channels formed in adjacent fuel flow field plate 31b.

Oxidant transition region 40 has a base 44 with numerous support features 42 provided thereon for purposes of supporting the two piece frame comprising pieces 27, 28. In a like manner, fuel transition region 41 has a base 45 with numerous support features 43 provided thereon for purposes of supporting the two piece frame comprising pieces 27, 28 on the side opposite support features 42. Similar support features 42a, 43b and transition region bases 44a, 45b are shown in the adjacent fuel cell assemblies in FIG. 3.

In the present invention, the support features in at least one of the oxidant and fuel flow field plates is taller than the landings in the flow field of that plate. FIG. 3 illustrates these various dimensions in an embodiment where the support features in both oxidant and fuel flow field plates are taller than their respective landings. As shown, support features 42a in oxidant flow field plate 30a are taller than landings 35a in the plate's flow field by an amount x. Also as shown, support features 43b in oxidant flow field plate 31b are taller than landings 36b in the plate's flow field by an amount y. As is evident in this Figure, the ability to form taller support features in the transition regions is possible only if gas diffusion layers 25, 26 do not extend into and through the transition regions, and are instead essentially adjacent their respective flow fields. And preferably, the design is such that the gas diffusion layers are essentially coextensive with their respective electrodes.

FIG. 3 also exemplifies an embodiment in which the depths of the transition regions are greater than the depths of the channels in the associated flow fields. For instance, base 44a of the oxidant transition region in oxidant flow field plate 30a is deeper than that of base 37a of the associated oxidant flow field channels by an amount m. Also, base 45b of the fuel transition region in fuel flow field plate 31b is deeper than that of base 38b of the associated fuel flow field channels by an amount n.

Increasing the heights of the support features and increasing the depths of the transition regions increases the total distance available for fluid flow in the transition regions. This improves the flow of reactants therein and thus improves the sharing of flow in the channels in the reactant flow fields. In FIG. 3, the total distance between taller support features 42a and base 44a of the deeper transition region is represented by the amount z. The total distance between taller support features 43 and base 45 of the deeper transition region is represented by the amount w. In practical embodiments, particularly for automotive purposes, it is expected that these total distances between the taller support features and deeper transition regions can be increased significantly compared to conventional embodiments in which x=y=m=n=0. For instance, it is expected that these total distances can be increased by an amount in the range from about 25 to 70% and/or an amount in the range from about 100 to 400 micrometers.

While not evident in the static depiction of FIG. 3, it can be advantageous to design the oxidant and fuel flow field plates such that opposing support features 42 and 43 are sufficiently tall that they actually interfere somewhat on assembly. By so doing, a spring loaded tension is provided after assembly that pinches and holds the frame comprising pieces 27, 28 in place. Additionally, this approach can account for variances in manufacturing and thicknesses and can ensure that there is always contact to the frame and thereby prevents the frame from moving around.

The invention therefore provides other potential advantages along with improvement in reactant flow and flow sharing between flow field channels.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A fuel cell assembly for a solid polymer electrolyte fuel cell stack comprising:
   a membrane electrode assembly comprising a solid polymer electrolyte membrane electrolyte, a cathode on a first side of the membrane electrolyte, and an anode on a second side of the membrane electrolyte;
   a frame attached to the periphery of the membrane electrode assembly;
   a cathode gas diffusion layer adjacent to the cathode;
   an anode gas diffusion layer adjacent to the anode;
   an oxidant flow field plate adjacent to the cathode gas diffusion layer and comprising:
      an oxidant flow field comprising a plurality of channels separated by landings on a side adjacent to the cathode gas diffusion layer, the landings having a height defining a plane, the channels having a base defining a plane, wherein essentially all of the cathode gas diffusion layer is adjacent the oxidant flow field;
      an oxidant port;
      a transition region between the oxidant flow field and the oxidant port wherein the transition region has a hydraulic diameter and has a base and comprises support features having a height;
   a fuel flow field plate adjacent to the anode gas diffusion layer and comprising
      a fuel flow field comprising a plurality of channels separated by landings on a side adjacent to the anode gas diffusion layer, the landings having a height defining a plane, the channels having a base defining a plane, wherein essentially all of the anode gas diffusion layer is adjacent the fuel flow field;
      a fuel port;
      a transition region between the fuel flow field and the fuel port wherein the transition region has a hydraulic diameter and has a base and comprises support features having a height; and a seal for sealing the frame to the oxidant and fuel flow field plates at an edge seal location;

wherein the hydraulic diameter of the transition region of at least one of the oxidant and fuel flow field plates from port to flow field is increased by increasing the height of the support features to be above the plane of the landings in the flow field and wherein a total distance between the support features and the base in the transition region is greater than a total distance between the plane of the landings and the plane of the base in the flow field by an amount in the range from 25 to 70% or an amount in the range from 100 to 400 micrometers.

2. The fuel cell assembly of claim 1 wherein a depth at the base of the transition region of the at least one flow field plate is greater than a depth at the plane of the base of the channels in the flow field of the at least one flow field plate.

3. The fuel cell assembly of claim 1 wherein the at least one flow field plate is made of metal.

4. The fuel cell assembly of claim 3 wherein the transition region of the at least one flow field plate comprises no adhesive.

5. The fuel cell assembly of claim 1 wherein the transition region of the at least one flow field plate comprises no adhesive.

6. A solid polymer electrolyte fuel cell stack comprising a series stack of a plurality of the fuel cell assemblies of claim 1.

7. A method of improving the flow sharing within a flow field in a fuel cell assembly for a solid polymer electrolyte fuel cell stack wherein the fuel cell assembly comprises:

a membrane electrode assembly comprising a solid polymer electrolyte membrane electrolyte, a cathode on a first side of the membrane electrolyte, and an anode on a second side of the membrane electrolyte;

a frame attached to the periphery of the membrane electrode assembly;

a cathode gas diffusion layer adjacent to the cathode;

an anode gas diffusion layer adjacent to the anode;

an oxidant flow field plate adjacent to the cathode gas diffusion layer and comprising:

an oxidant flow field comprising a plurality of channels separated by landings on a side adjacent to the cathode gas diffusion layer, the landings having a height defining a plane, the channels having a base defining a plane, wherein essentially all of the cathode gas diffusion layer is adjacent the oxidant flow field;

an oxidant port;

a transition region between the oxidant flow field and the oxidant port wherein the transition region has a hydraulic diameter and has a base and comprises support features having a height;

a fuel flow field plate adjacent to the anode gas diffusion layer and comprising a fuel flow field comprising a plurality of channels separated by landings on a side adjacent to the anode gas diffusion layer, the landings having a height defining a plane, the channels having a base defining a plane, wherein essentially all of the anode gas diffusion layer is adjacent the fuel flow field;

a fuel port;

a transition region between the fuel flow field and the fuel port wherein the transition region has a hydraulic diameter and has a base and comprises support features having a height; and a seal for sealing the frame to the oxidant and fuel flow field plates at an edge seal location;

the method comprising increasing the hydraulic diameter of the transition region of at least one of the oxidant and fuel flow field plates from port to flow field by increasing the height of the support features to be above the plane of the landings in the flow field and increasing a total distance between the support features and the base in the transition region to be greater than a total distance between the plane of the landings and the plane of the base in the flow field by an amount in the range from 25 to 70% or an amount in the range from 100 to 400 micrometers.

8. The method of claim 7 comprising increasing a depth at the base of the transition region of the at least one flow field plate such that the depth at the base of the transition region is greater than a depth at the plane of the base of the channels in the flow field of the at least one flow field plate.

9. The method of claim 7 wherein the at least one flow field plate is made of metal.

10. The method of claim 9 wherein no adhesive is employed in the transition region of the at least one flow field plate.

11. The method of claim 7 wherein no adhesive is employed in the transition region of the at least one flow field plate.

\* \* \* \* \*